United States Patent Office 2,809,986

Patented Oct. 15, 1957

2,809,986

METHOD FOR THE PURIFICATION OF MALONONITRILE

Alvin Charles Flisik, Stony Point, and Leonard Nicholl, Nyack, N. Y., assignors to Kay-Fries Chemicals, Inc., West Haverstraw, N. Y., a corporation of New York No Drawing. Application November 17, 1955, Serial No. 547,561

10 Claims. (Cl. 260—465.2)

The invention relates to a method for the purification of malononitrile, and more particularly to a procedure in which the purification is effected by crystallization and includes correlated improvements and discoveries, whereby the obtention of malononitrile in relatively pure form results.

Previous methods for the purification of malononitrile have employed distillation for its isolation. While this procedure on a laboratory scale is quite safe and practical, nevertheless, distillation at normal pressures of quantities larger than approximately 50 ml. is unsafe, inasmuch as violent decomposition frequently occurs. It is stated in Organic Syntheses, vol. 10, page 68, that "the liquid darkens, boils spontaneously, and finally spurts from the flask in a cloud of white fumes and burning liquid."

It has been our finding that the same condition pertains, exclusive of the burning, when even smaller quantities are heated under vacuum.

In accordance with the usual procedure, the reaction mixtures are filtered and evaporated with the result that a relatively crude malononitrile is obtained as a residue, and it is this crude malononitrile which is subjected to distillation in order to effect purification thereof.

It follows from the facts above stated that distillation of malononitrile on a relatively large scale, as in normal plant operation with a necessarily extended time of heating, is rather hazardous.

Further, malononitrile tends to polymerize when stored in the form either of its filtered or unfiltered reaction mixture for periods which may be several days or several weeks, and this tendency has made large scale operation impractical. Inasmuch as it is not possible always to process a reaction mixture immediately in normal plant operation, the tendency to polymerize when stored results in a material lowering in the yield.

It is a principal object of the invention to provide a method for the production of malononitrile which does not require distillation for its purification, and thus obviates the disadvantages of former procedure.

Another object of the invention is the provision of a method for the production of malononitrile which gives a stable reaction mixture that may be stored for a period, e. g. of weeks without material loss.

A further object of the invention is to provide a method whereby malononitrile may be readily, effectively and economically purified.

A particular object of the invention is the provision of a method for the production of malononitrile in accordance with which a reaction mixture containing malononitrile may have it separated therefrom in crystalline form by neutralization with a weakly basic substance and subsequent treatment with a crystallization solvent.

A specific object of the invention is to provide a method in which malononitrile is obtained from its reaction mixture in pure form by neutralizing the reaction mixture with anhydrous ammonia and subsequently treating with a low molecular weight monohydric aliphatic alcohol, e. g., isopropanol, with attending crystallization of malononitrile.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

Malononitrile may be produced by reacting cyanoacetamid with a dehydrating agent such as phosphorus oxychloride, in an inert solvent, which may be ethylene dichloride and may contain an adsorbent, e. g. a diatomaceous earth, and separating the malononitrile from the reaction mixture by distillation. Such a process is described and claimed in the application of George Kesslin and Leonard Nicholl filed of even date herewith, Serial No. 547,568.

The present invention is an improvement thereon, whereby the malononitrile is separated and purified by a crystallization procedure, and such improvement comprises neutralizing the reaction mixture with a weakly basic substance separating liquid and solid, as by filtration, evaporating separated liquid with removal of solvent and any excess dehydrating agent, cooling, which may be to a temperature of about 50° C., then adding a crystallization solvent to separated liquid, followed by further cooling to a temperature at least as low as about 25° C., suitably to a temperature of about 10° C., and desirably with the addition of seed crystals of malononitrile. Such procedure is attended by the crystallization of malononitrile and as a final stage, the crystalline malononitrile is separated from the mother liquor, which may be effected by filtration.

Malononitrile may thus be obtained having a purity of over 90%, and this may be further purified to a purity of approximately 99% by removing remaining solvent through distillation under vacuum with the obtention of a liquid which yields malononitrile in crystalline form. The purified product is thus obtained in a yield of about 58% of theory, based on the cyanoacetamid. Moreover, a further amount of malononitrile may be obtained from the mother liquor by evaporation thereof to about one third of its initial volume. This product is slightly impure and may be further purified. This further quantity of malononitrile raises the yield to about 63% of theory, based on cyanoacetamid.

The weakly basic substance utilized to neutralize the reaction mixture may be ammonia, suitably in anhydrous form, carbonates and bicarbonates of sodium, potassium and ammonium, and sodium and potassium salts of low molecular weight fatty acids, for example, the salts of acetic and propionic acids. Furthermore, the neutralization of the reaction mixture desirably is effected at a temperature from about 25° C. to about 40° C., and the addition of the weakly basic substance may be continued until the liquid gives a neutral test to alkacid paper.

The solvent utilized to occasion separation of the malononitrile in crystalline form from the liquid may be of various types, of which mention may be made of a low molecular weight monohydric aliphatic alcohol such as methyl, ethyl, normal propyl, isopropyl and normal, secondary and tertiary butyl alcohols, an ether, for example, isopropyl and isobutyl ethers, a liquid hydrocarbon, e. g., benzene and toluene, and water.

As an illustrative embodiment of a manner in which the invention may be practiced, the following example is presented.

*Example*

Malononitrile may be prepared by introducing 252 gms. of cyanoacetamid and 100 gms. of the diatomaceous earth, commonly designated as "Super-Cel," into 725 ml. of ethylene dichloride under agitation. This reaction mass is brought to reflux temperature (about 85° C.) and 160 ml. of phosphorus oxychloride are added thereto during a period of one hour, with the reflux being continued for a further period of about seven hours. During the reflux period, the temperature of the liquid drops to about 70° C., and then rises to about 85° C., with the reaction being substantially complete at that temperature.

The reaction mixture so prepared is now cooled to a temperature from 20° C. to 25° C. and anhydrous ammonia introduced thereinto with cooling to maintain the temperature of the liquid from 25° C. to 40° C. and until the reaction mixture is indicated as having reached the neutral point by means, for example, of an alkacid paper. The neutralized reaction mixture, which contains a solid material in granular form and is composed of discrete particles, is filtered and the filter cake so produced is washed twice with two 200 ml. portions of ethylene dichloride.

The filtrate and the washings are combined and evaporated atmospherically to a liquid temperature of 90° C. Balance of distillation is carried out under vacuum of about 50 mm. of mercury and maximum liquid temperature of 90° C. in order to remove ethylene dichloride. The residue containing the malononitrile in crude form is cooled to about 50° C., and thereto is added 400 ml. of isopropyl alcohol and one to two grams of a decolorizing carbon, e. g., "Darco." This mixture is stirred at about 40° C. for a period which may be 15 minutes, and is then filtered in order to remove the carbon. The filtrate is now rapidly cooled to a temperature at least as low as about 25° C. and seed crystals of malononitrile added, with the cooling being continued and carried down to about 10° C. There is thus obtained a slurry containing well-formed crystals of malononitrile which are separated from the mother liquor, suitably on a suction filter. The filter cake thus produced contains malononitrile in crystalline form and has a purity of approximately 90%.

This product may be further purified to a purity of approximately 99% by transferring the crystal mass to a distilling flask and removing the remaining isopropanol to a liquid temperature of about 90° C. under vacuum of 30 mm. of mercury. A residue in the form of a light yellow liquid remains, which solidifies to a crystalline mass of malononitrile having a melting point of 31° C. The procedure gives a yield of about 58% of theory, based on the amount of cyanoacetamid used. A further amount with an increase in yield to about 63% of theory may be obtained by evaporating the mother liquor to one third of its original volume. The product is slightly impure but increases the obtainable yield to about 125 gms.

It will be realized that the procedure just above given is not limitative but rather that comparable results may be obtained through the utilization of other weakly basic substances, such as sodium carbonate and sodium acetate and other crystallization solvents, for example, ethyl alcohol, normal butyl alcohol, isopropyl ether and benzene. Moreover, the weakly basic substances preferably are in substantially dry condition.

The foregoing procedure, wherein malononitrile is obtained in a reaction mixture and is separated therefrom in crystalline form, obviates the previous method of purification, which was by distillation and a somewhat hazardous operation when conducted on a large scale. The obtention of malononitrile as a crystalline material materially minimizes the time required for heating, and thus renders large scale manufacture of malononitrile entirely practical and safe.

Further, the treatment of the reaction mixture containing malononitrile with a weakly basic substance, such as anhydrous ammonia, dry sodium carbonate or dry sodium acetate, occasions the elimination of excess hydrochloric acid formed during the reaction and of excess phosphorus oxychloride, which may be present at the end of the reaction. This neutralization permits the liquid containing malononitrile to be stored for an extended period of time, which may be upwards from two months without any noticeable decrease in yield. However, when the method of the present invention is not employed and the malononitrile containing liquid stored for a period of as long as two months, there was a marked decrease in yield of as much as 15%.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a method for the production of malononitrile, which comprises reacting cyanoacetamid with a dehydrating agent in an inert solvent and separating malononitrile from the reaction mixture, the improvement comprising neutralizing the reaction mixture with a weakly basic substance at a temperature of about 25° C. to about 40° C., separating liquid and solid, evaporating separated liquid with removal of solvent, cooling to a temperature of about 50° C., then adding a crystallization solvent, further cooling to a temperature at least as low as about 25° C. with attending crystallization of malononitrile, and finally separating crystalline malononitrile from mother liquor.

2. In a method for the production of malononitrile, which comprises reacting cyanoacetamid with a dehydrating agent in an inert solvent and separating malononitrile from the reaction mixture, the improvement comprising neutralizing the reaction mixture with a weakly basic substance at a temperature of about 25° C. to about 40° C., separating liquid and solid, evaporating separated liquid with removal of solvent, cooling to about 50° C., then adding a crystallization solvent, further cooling to a temperature of about 10° C. with addition of seed crystals of malononitrile and attending crystallization of malononitrile, and finally separating crystalline malononitrile from mother liquor.

3. In a method for the production of malononitrile, which comprises reacting cyanoacetamid with a dehydrating agent in an inert solvent and separating malononitrile from the reaction mixture, the improvement comprising neutralizing the reaction mixture with ammonia at a temperature of about 25° to about 40° C., separating liquid and solid, evaporating separated liquid with removal of solvent, cooling to a temperature of about 50° C., then adding a crystallization solvent, further cooling to a temperature at least as low as about 25° C. with attending crystallization of malononitrile, and finally separating crystalline malononitrile from mother liquor.

4. In a method for the production of malononitrile, which comprises reacting cyanoacetamid with a dehydrating agent in an inert solvent and separating malononitrile from the reaction mixture, the improvement comprising neutralizing the reaction mixture with anhydrous ammonia at a temperature of about 25° C. to about 40° C., separating liquid and solid, evaporating separated liquid with removal of solvent, cooling to a temperature of about 50° C., then adding a crystallization solvent, further cooling to a temperature at least as low as about 25° C. with attending crystallization of malononitrile, and finally separating crystalline malononitrile from mother liquor.

5. In a method for the production of malononitrile, which comprises reacting cyanoacetamid with a dehydrating agent in an inert solvent and separating malononitrile from the reaction mixture, the improvement comprising neutralizing the reaction mixture with a weakly basic substance at a temperature of about 25° C. to about 40° C., separating liquid and solid, evaporating separated liquid with removal of solvent, cooling to a temperature of about 50° C., then adding a low molecular weight monohydric aliphatic alcohol to separated liquid, further cooling to a temperature at least as low as about 25° C. with attending crystallization of malononitrile, and finally separating crystalline malononitrile from mother liquor.

6. In a method for the production of malononitrile, which comprises reacting cyanoacetamid with a dehydrating agent in an inert solvent and separating malonontrile from the reaction mixture, the improvement comprising neutralizing the reaction mixture with a weakly basic substance at a temperature of about 25° C. to about 40° C., separating liquid and solid, evaporating separated liquid with removal of solvent, cooling to a temperature of about 50° C., then adding isopropanol to separated liquid, further cooling to a temperature at least as low as about 25° C. with attending crystallization of malononitrile, and finally separating crystalline malononitrile from mother liquor.

7. In a method as defined in claim 1, wherein the improvement comprises neutralizing the reaction mixture with sodium carbonate.

8. In a method as defined in claim 1, wherein the improvement comprises neutralizing the reaction mixture with sodium acetate.

9. In a method for the production of malononitrile, which comprises reacting cyanoacetamid with a dehydrating agent in an inert solvent and separating malononitrile from the reaction mixture, the improvement comprising neutralizing the reaction mixture with anhydrous ammonia at a temperature of about 25° C. to 40° C. separating liquid and solid, evaporating separated liquid with removal of solvent, cooling to a temperature of about 50° C., then adding isopropanol to separated liquid, further cooling with addition of seed crystals of malononitrile to a temperature of about 10° C. and attending crystallization of malononitrile, and finally separating crystalline malononitrile from mother liquor.

10. In a method for the production of malononitrile, which comprises reacting cyanoacetamid with a dehydrating agent in an inert solvent and separating malononitrile from the reaction mixture, the improvement which comprises the steps of neutralizing the reaction mixture with anhydrous ammonia to a temperature of about 25° to about 40° C., separating liquid and solid, evaporating separated liquid with removal of solvent, cooling to a temperature of about 50° C., adding isopropanol to separated liquid, and cooling to a temperature at least as low as about 25° C. with attending crystallization of malononitrile from mother liquor.

References Cited in the file of this patent

UNITED STATES PATENTS 2,389,217 Surrey ---------------- Nov. 20, 1945
2,459,128 Fahrenbach ------------ Jan. 11, 1949